May 16, 1933. S. SCHIFF 1,909,224
MEANS FOR CONTROLLING FLUID LEAKAGE
Filed Jan. 24, 1930 2 Sheets-Sheet 1

Inventor
Sigmund Schiff
By Murray and Zugelter
Attorneys

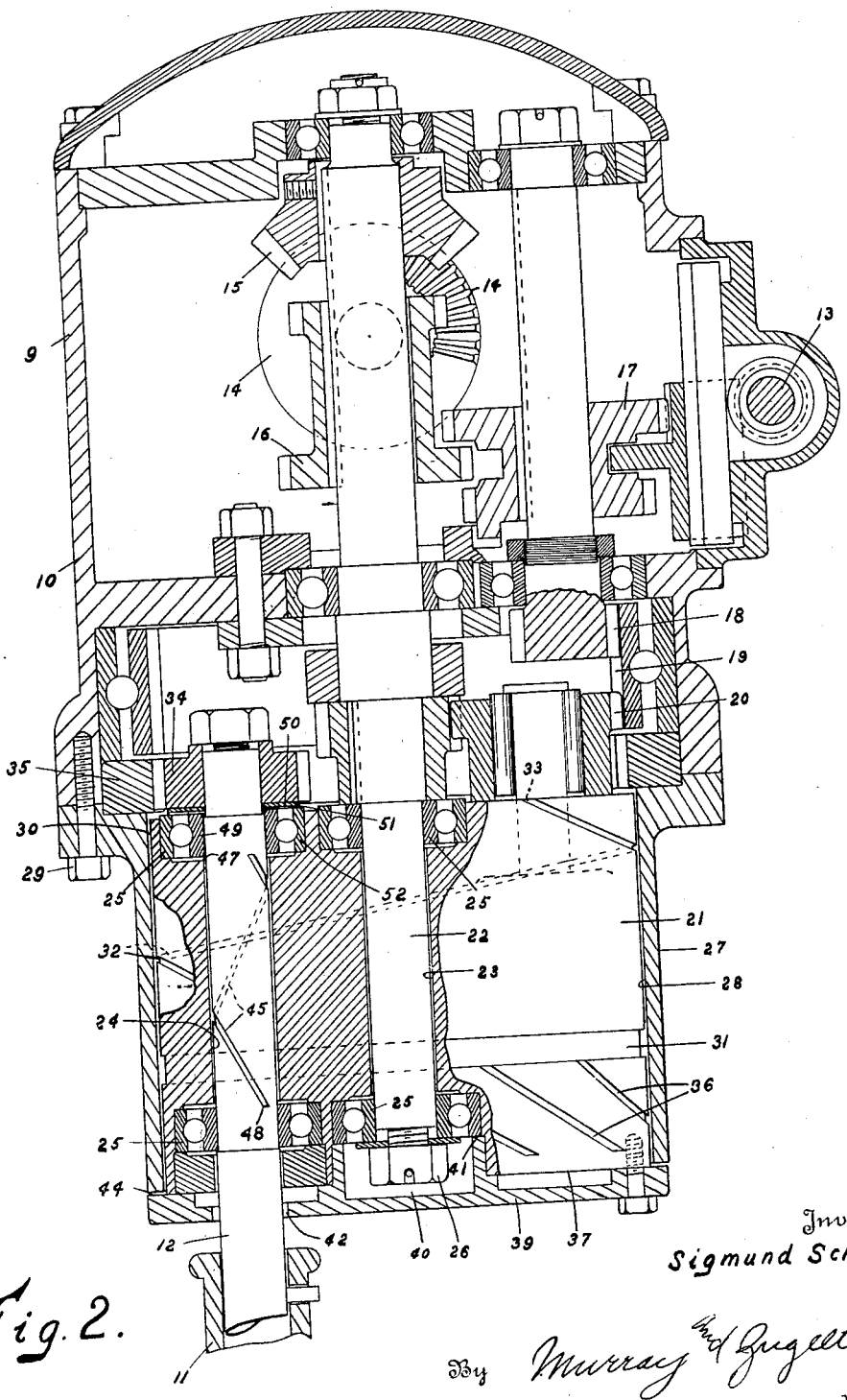

Patented May 16, 1933

1,909,224

UNITED STATES PATENT OFFICE

SIGMUND SCHIFF, OF CINCINNATI, OHIO, ASSIGNOR TO THE J. H. DAY COMPANY, OF CINCINNATI, OHIO, A CORPORATION OF OHIO

MEANS FOR CONTROLLING FLUID LEAKAGE

Application filed January 24, 1930. Serial No. 423,278.

This invention relates to a means for precluding leakage of lubricant from a lubricant reservoir having rotating parts extending therefrom.

An object of the invention is to provide a construction of fluid reservoir and extending rotating parts, wherein leakage of lubricant along said parts, while the extending parts are at rest, is precluded by capillary action; during rotation of said parts, leakage is precluded by the impelling action of spiral grooves cooperating with a closely adjacent smooth wall.

Another object is to provide means for overcoming the tendency towards leakage, which results from vibration of the rotating parts imparted by the action of an exterior force or strain.

These and other objects are attained by the means described herein and disclosed in the accompanying drawings, in which:

Fig. 2 is a cross-sectional view on line 2—2 of Fig. 1, certain parts of the device being shown in elevation.

Figures 1, 3:
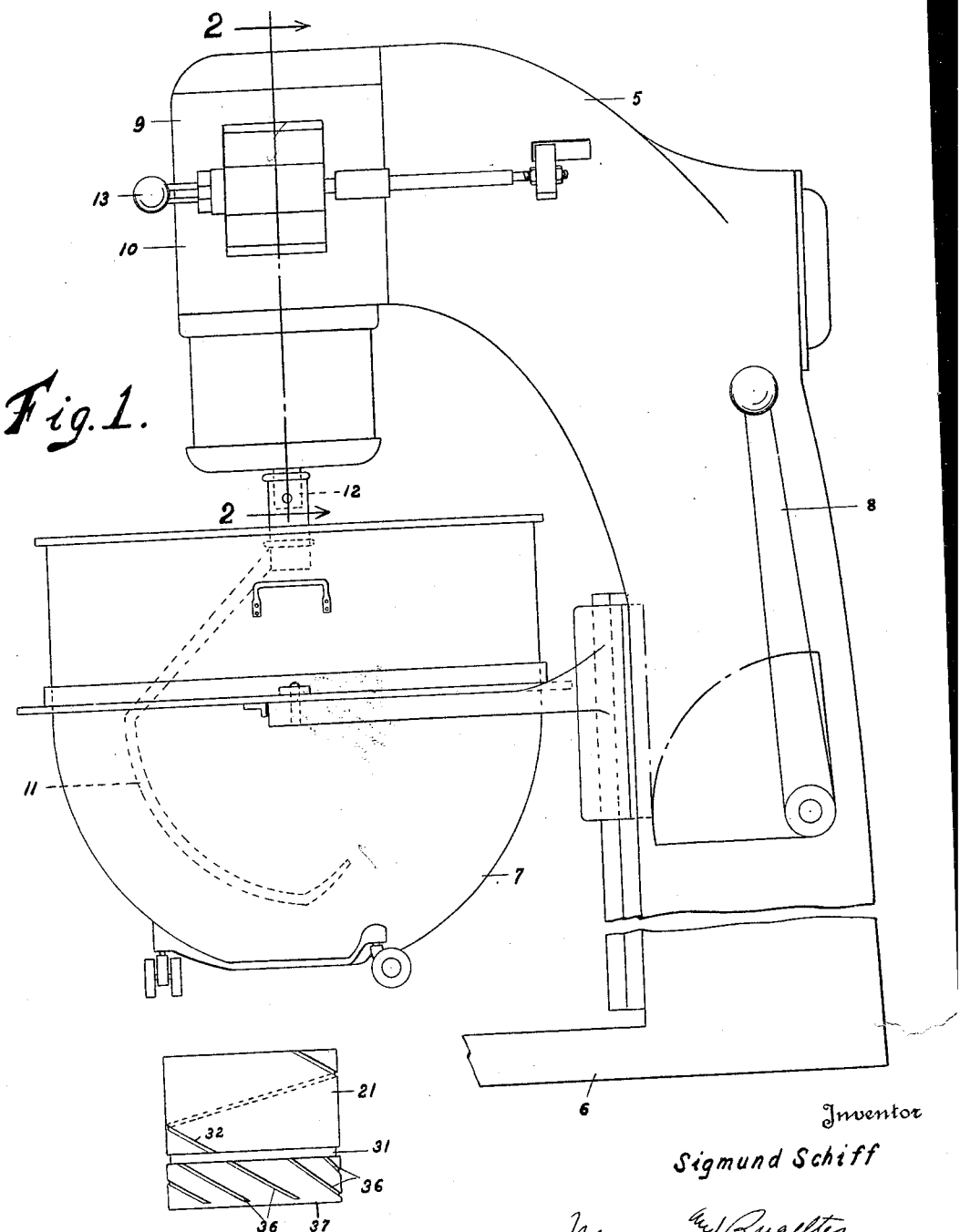
Fig. 1 is a side elevational view of a mixing device embodying the invention.
Fig. 3 is an elevational view greatly reduced in size, showing one of the rotating parts forming an element of the device of the invention.

The invention herein consists of providing means, in conjunction with a fluid reservoir or gear case and rotating shafts or other members extending therefrom, for precluding leakage of lubricant from said reservoir or gear case along such shafts or rotating members. Heretofore, various forms of packing or stuffing boxes were provided, with a view to eliminating such leakage, and although the leakage was thereby placed under control, leakage would occur as soon as the packing became slightly worn or glazed by the friction of the shafts. There are certain types of machines in which leakage of lubricant cannot be tolerated for reasons of sanitation, for example, machines operating upon food products that would be ruined or rendered unfit for consumption by leakage of lubricating oil thereinto. The present invention discloses a construction wherein the unreliable packing and stuffing boxes are eliminated, the lubricant itself forming a seal for precluding leakage of a body of lubricating oil from an overhead reservoir.

For purposes of explanation, the invention is disclosed as applied to a dough or batter mixing machine, which represents one type of device, wherein the prevention of leakage is of the utmost importance. It is to be understood, however, that the invention is not to be restricted to use in a dough mixer, although it is particularly adaptable to use in such machines.

In Fig. 1 is disclosed a dough mixer which consists of a standard 5 mounted upon a base 6, and which is provided with a mixing bowl 7, mounted upon the standard for vertical reciprocation by means of a lever 8. The upper portion of the standard carries a head 9, which consists of a gear case 10 containing the driving mechanism for the agitator 11, which is removably mounted upon a vertical agitator shaft 12 extending from the gear case. A clutch control lever 13 co-operates with the gearing of the head and with a suitable driving motor, which may be mounted upon the standard, for controlling rotation of the agitator shaft.

The driving pinion 14, which is driven by the motor, is adapted for co-operation with a train of gears 15, 16, 17 and 18, for rotating an internal ring gear 19, which in turn rotates a pinion 20 in driving relation with a revolving head or drum 21.

The revolving head or drum is supported from the gear case housing by means of a central vertical shaft 22. It should be noted that the revolving head or drum 21 is substantially a solid elongated body provided with long bores 23 and 24 for reception of the central shaft 22 and shaft 12, respectively. The shafts 12 and 22 are revoluble in their respective bores, and are supported therein upon anti-friction bearings 25. A nut 26 on the lower end of shaft 22 serves to retain the revolving head or drum in a suspended position relative to the gear casing.

About the revolving head or drum, is disposed a longitudinal cylindrical drum guard 27 having a deep smooth bore 28, the walls of which are normally out of contact with the revolving head or drum. The cylindrical drum guard is removably secured to the gear casing by means of bolts 29. It is important, when fitting the drum guard about the drum, to provide a proper amount of clearance 30 therebetween, for in this space is formed the seal for the lubricant contained in the gear casing above. The amount of clearance between the drum guard and the revolving head or drum, is governed by the viscosity of the lubricant used in the gear casing; the use of a thin bodied lubricant requires less clearance between the parts than does a lubricant of heavy body or consistency. It has been found that a lubricant known as Gargoyle gear compound will maintain a capillary seal, between vertical surfaces having a clearance of 2 or 3 thousandths inch, which will effectively resist leakage.

It is to be noted that the clearance space between the drum and drum guard is in direct communication with the interior of the gear case, as indicated at 20. When the drum is stationary within the drum guard, capillary attraction of the lubricant between the outer and inner surfaces of the drum and drum guard, is sufficient to preclude leakage of lubricant. Thus it may be stated that there is present an equilibrium of forces acting to gravitate the lubricant, and to resist gravitation thereof. Upon imparting rotation to the revolving drum, this equilibrium is disturbed, thereby permitting gravitation to overcome the capillary forces. In order to preclude said downward movement of the lubricant, there is provided on the cylindrical surface of the drum, a circular collecting groove 31 which communicates with the oil reservoir or gear case interior, by means of a shallow spiral groove 32 which encircles the drum. The upper end 33 of the spiral groove is in free communication with the lubricant reservoir. The direction of rotation of the revolving drum, and the direction in which the spiral groove encircles the exterior surface of the drum, are indicated in Fig. 3. Rotation of the drum is in one direction only, for to rotate the drum in a reverse direction would cause the spiral groove to urge the lubricating compound downwardly instead of upwardly.

To explain the function of the short oil lifting channels 36, it is necessary to first explain the action of the agitator shaft 12. The upper end of the agitator shaft 12 has fixedly mounted thereon a spur gear 34 which meshes with an internal ring gear 35. It should be readily apparent that as the drum is rotated within the drum guard, the teeth of the spur gear 34 will ride upon the teeth of the ring gear, thereby imparting rotatory motion to the agitator shaft. It will be readily understood, therefore, that the agitator shaft not only rotates in its bearings 25, but it also revolves about the axis of central shaft 22. When the mixing machine is in use, the agitator 11 extends into the batter contained in the bowl 7, and as the batter is worked to a homogeneous mass, there results a vibration and slight flexing of the agitator shaft and also of the central shaft 22. Obviously, flexing of the central shaft will cause the lower portion of the revolving drum to vibrate within the drum guard, thereby impairing uniformity of clearance between the drum and guard near the lower portions thereof. Without the oil lifting channels 36, there would be a leakage or squeezing out of the lubricant near the lower edge of the revolving drum, because of the varying amount of clearance.

To overcome the leakage or squeezing out of the lubricant near the lower edge of the revolving drum, said drum is provided with a series of spiral oil lifting channels 36, each of which communicates with the oil collecting groove 31. The channels 36 are disposed below the groove 31, and the lower extremities thereof terminate at points spaced from the lower outer edge 37 of the revolving drum. Any lubricant in the region of the channels 36, displaced by reason of vibration of the drum, therefore, will quickly be urged upwardly by the action of the spiral channels 36. There is no movement of the lubricant in grooves 36 while the machine is at rest because of the capillary seal, formed between and below said grooves, precludes such movement.

It is to be noted that the drum guard normally does not provide a bearing for the revolving drum, but that the wall thereof may serve as a safety stop or limiting means for the drum at such times as the load on the agitator becomes great enough to flex the center shaft 22. The drum guard serves to prevent flexing of the center shaft beyond the elasticity limit of the shaft material.

To the under face of the revolving drum is bolted or otherwise secured a cap 39 having a central compartment or well 40, the annular wall 41 of which abuts the stationary race of the lower ball bearing 25. Any lubricant that enters the bore 23 and well 40 will be confined therein. The cap also is provided with an enlarged opening 42 for free reception of the agitator shaft 12. The upper annular edge 44 of the cap is spaced from the lower corresponding edge of the stationary drum guard to permit relative movement of the drum guard and cap.

To preclude leakage of lubricant along the agitator shaft 12, said shaft is provided with a shallow and continuous oil groove 45, the upper end 46 of which is constantly in communication with the space 47 between the upper ball bearing races. The lower end 48 of said groove likewise is in communication with a similar space between the lower bearing races. As before explained, the space between the shaft 12 and bore 24, through which it extends, is of a clearance (approximately 2 or 3 thousandths inch) in which may form a capillary seal similar to that between the drum and drum guard. Clamped between the gear 34 and the bearing race 49 on shaft 12, is a lubricant retainer in the form of a disc 50 having shallow radial or cross grooves to let some oil enter bearing 25 by the pumping force of the intermeshing teeth of the internal gear 35 and agitator gear 34. The outer peripheral edge 51 thereof is disposed above and very slightly spaced from the stationary bearing race 52 of bearing 25. As the disc rotates with the agitator shaft, the lubricant touching the edge 51 is thrown outwardly by centrifugal force and is thereby precluded from free entry into the bore 24. At the same time, the radial grooves will yield to upward pressure of lubricant created by the spiral groove 45.

The operation of the device is as follows. It is to be assumed that the gear casing contains an amount of lubricant or gear compound sufficient to cover the gears 18, 19, 20 and 34, the normal level of lubricant in the casing being slightly below the gear 16. While the machine is idle, the lubricant rests in the annular space between the revolving drum and guard for effecting a capillary seal which precludes gravitation of the lubricant from the gear casing. A similar seal is formed between the agitator shaft 12 and the bore 24 through which it extends. An equilibrium of forces tending to gravitate and preclude gravitation of the mass of lubricant is thereby attained. Upon operation of the machine, the movement of the agitator shaft in its bore and of the drum in the drum guard, tends to disturb this equilibrium, with the result that gravitation tends to overcome the effort of the lubricant to maintain the seal. Gravitation, however, is thereupon overcome by the impelling action of the spiral grooves or channels 32 or 45 upon the lubricant, whereupon the lubricant is urged upwardly against the force of gravity. In this regard, it is suggested that there is likely no actual upward or downward movement of the lubricant, and that the lubricant or oil film is maintained in a condition of equilibrium by capillarity while the machine is inoperative; when the machine is operative, said film is likewise maintained in a condition of equilibrium by the additional action of the spiral grooves. As the load on the agitator increases by reason of stiffening of the batter, there results a vibrating of the central shaft carrying the rotating drum. This causes springing or flexing of the central shaft, which results in a non-uniformity of clearance space about the drum. In those locations where the space is increased, the lubricant tends to gravitate, while in those where the space is decreased, the lubricant is spread by the pressure. The plurality of spiral channels 36 pick up this lubricant and urge it upwardly to the collecting groove 31, whence it is elevated or distributed by the groove 32.

It is of importance that the end 33 of spiral groove 32 be located upon the drum at a point substantially removed from the region of the agitator gear 34, as the pumping action of this gear when driven by the internal gear 35 is sufficient to force lubricant into the groove 32 in such quantities, and with such force, as to overcome the effectiveness of capillary attraction to preclude leakage along the drum.

In constructions wherein there is no springing action of the shafts 22 and 12 by the movement of an agitator or the like, the series of grooves 36, and groove 31, may be eliminated; the long spiral groove 32, extending from 33 to a point adjacent to but spaced from the lower edge 37 of the drum, would be effective for maintaining the capillary seal and precluding leakage along the drum.

It is to be understood that various modifications and changes in structural details of the device may be made, within the scope of the claims, without departing from the spirit of the invention.

What is claimed is:

1. In combination with an overhead reservoir for viscous fluid having a deep circular opening in the bottom thereof, a longitudinal normally stationary member arranged for unidirectional rotation and supported in the deep opening in spaced relation with the wall of said opening to provide an annular clearance space into which the viscous fluid may enter for effecting a seal therein, spiral means on the rotatable member and inclined downwardly in the direction of rotation of said rotatable member for upwardly urging the fluid forming the seal upon rotation of the rotatable member, and a series of spiral means disposed below the first mentioned spiral means and in communication therewith, for feeding displaced fluid to the first mentioned spiral means.

2. In combination with an overhead reservoir for viscous fluid having a deep circular opening therein, a longitudinal normally stationary rotatable member extending from the reservoir and supported in the deep opening in spaced relation with the wall of said opening to provide an annular clearance space into which the viscous fluid may enter for effecting sealing of the clearance space, means including a disc movable with the rotatable member and serving to impede entry of sealing fluid to the clearance space, and spiral means, operative upon disturbing said seal by rotation of the rotatable member in one direction of rotation, for urging the sealing fluid toward the reservoir and past the disc.

3. The combination of a reservoir for viscous fluid having an opening in a wall thereof, a guard member having a deep circular opening communicating with the opening of the reservoir, a rotatable shaft extending through the openings concentrically with the opening of the guard member, a cylindrical grooved drum having a central bore and a second bore, said drum being supported upon the rotatable shaft for rotation within the opening of the guard member, the space between the drum and interior of the guard member being in communication with the interior of the reservoir and the grooves of the drum being arranged for urging, toward the reservoir, fluid seepage in the space between the drum and guard member, a spirally grooved rotatable shaft in the second bore of the drum and extending into the fluid reservoir, said shaft being supported in annular spaced relation with the wall of the second bore, the grooves thereof being arranged for urging, toward the reservoir, fluid seepage contained in the annular space, and means including a rotatable member on the last mentioned shaft for impeding entry of fluid from the reservoir into the said annular space.

4. In combination with an overhead reservoir for viscous fluid having an enlarged and deep circular opening in the bottom thereof, a rotatable elongated cylindrical drum the curved outer surface of which is for the most part free of undulations, said drum being disposed within the deep circular opening and fitted therein too loosely to have a normal bearing relationship therewith, thereby providing a capacious and substantially continuous and uniform annular clearance space between the drum and the wall of the deep circular opening and into which space the viscous fluid may freely enter for effecting sealing of the exaggerated clearance space, the length of the clearance space being so related to the weight and viscosity of the fluid that advancement thereof through said space is overcome by the capillary resistance of the fluid within the space when the drum is at rest, spiral means on one of the walls defining the exaggerated clearance space and operative upon the sealing fluid when the drum is rotated in a given direction, for urging the fluid toward the reservoir as the fluid seal is disturbed by rotation of the drum, and bearing means for maintaining the drum centered in the enlarged opening of the reservoir.

5. In combination with a reservoir for viscous fluid having an enlarged and deep circular opening in a wall thereof, a rotatable elongated cylindrical drum the curved outer surface of which is for the most part free of undulations, said drum being disposed within the deep circular opening and fitted therein too loosely to have a normal bearing relationship therewith, thereby providing a capacious and substantially continuous and uniform annular clearance space between the drum and the wall of the deep circular opening and into which space the viscous fluid may freely enter for effecting sealing of the exaggerated clearance space, the length of the clearance space being so related to the weight and viscosity of the fluid that advancement thereof through said space is overcome by the capillary resistance of the fluid within the space when the drum is at rest, spiral means on one of the walls defining the exaggerated clearance space and operative upon the sealing fluid when the drum is rotated in a given direction, for urging the fluid toward the reservoir as the fluid seal is disturbed by rotation of the drum, and bearing means for maintaining the drum centered in the enlarged opening of the reservoir.

6. In combination with a reservoir for viscous fluid having an enlarged and deep circular opening in a wall thereof, a rotatable elongated cylindrical drum the curved outer surface of which is for the most part free of undulations, said drum being disposed within the deep circular opening and fitted therein too loosely to have a normal bearing relationship therewith, thereby providing a capacious and substantially continuous and uniform annular clearance space between the drum and the wall of the deep circular opening and into which space the viscous fluid may freely enter for effecting sealing of the exaggerated clearance space, the length of the clearance space being so related to the weight and viscosity of the fluid that advancement thereof through said space is overcome by the capillary resistance of the fluid within the space when the drum is at rest, spiral means on one of the walls defining the exaggerated clearance space and operative upon the sealing fluid when the drum is rotated in a given direction, for urging the fluid toward the reservoir as the fluid seal is disturbed by rotation of the drum, bearing means for maintaining the drum centered in the enlarged opening of the reservoir and a rotating agitator shaft journalled in the drum and extending therefrom in substantial parallelism with the axis of rotation of the drum.

In testimony whereof, I have hereunto subscribed my name this 20th day of January 1930.

SIGMUND SCHIFF.